United States Patent [19]

Kawasaki et al.

[11] Patent Number: 4,621,918
[45] Date of Patent: Nov. 11, 1986

[54] COMPENSATION FOR DIAPHRAGM CONTROL IN SLR CAMERA

[75] Inventors: Masahiro Kawasaki, Tokyo; Zenichi Okura, Ichikawa; Fumio Urano, Omiya, all of Japan

[73] Assignee: Asahi Kogaku Kogyo Kabushiki Kaisha, Tokyo, Japan

[21] Appl. No.: 235,839

[22] Filed: Feb. 19, 1981

Related U.S. Application Data

[63] Continuation-in-part of Ser. No. 229,879, Jan. 30, 1981.

[30] Foreign Application Priority Data

Feb. 19, 1980 [JP] Japan .................................. 55/19965

[51] Int. Cl.$^4$ .............................................. G03B 7/085
[52] U.S. Cl. .................................... 354/448; 354/455; 354/271.1
[58] Field of Search ...................... 354/24, 43, 46, 271, 354/286

[56] References Cited

U.S. PATENT DOCUMENTS

| | | | |
|---|---|---|---|
| 4,150,889 | 4/1979 | Ueda et al. ...................... | 354/286 X |
| 4,168,892 | 9/1979 | Ueda et al. ...................... | 354/286 X |
| 4,245,901 | 1/1981 | Karikawa et al. ................ | 354/46 X |

Primary Examiner—Michael L. Gellner
Attorney, Agent, or Firm—Christie, Parker & Hale

[57] ABSTRACT

A camera comprises a camera body and first and second lens assemblies interchangeably insertable into the camera body. Each lens assembly has a displaceable actuator, a diaphragm adjustable between a maximum aperture and a minimum aperture value responsive to displacement of the actuator and a transducer for generating a first signal representative of the displacement of the actuator. In the camera body, there is generated a second signal representative of the desired aperture value of the diaphragm for correct exposure. The first and second signals are compared and the actuator of the lens assembly inserted in the camera body is displaced responsive to the comparison to stop down the diaphragm from the maximum aperture value toward the minimum aperture value until the first and second signals assume a predetermined relationship. The diaphragm of the second lens assembly is maintained at the maximum aperture value during an initial portion of the displacement of the actuator. Preferably, the initial portion of the actuator displacement is sufficient to compensate for the deviation in aperture value, maximum aperture value, and minimum aperture between the first and second lens assemblies.

11 Claims, 6 Drawing Figures

COMPENSATION FOR DIAPHRAGM CONTROL IN SLR CAMERA

CROSS REFERENCE TO RELATED APPLICATIONS

This is a continuation-in-part of application Ser. No. 229,879, filed on Jan. 30, 1981, which claims priority of Japanese Patent Application No. 1980-10978. The disclosure of this application is incorporated fully herein by reference.

BACKGROUND OF THE INVENTION

This invention relates to compensation in a single-lens reflex (SLR) camera and is particularly applicable to such a camera having automatic exposure capability and interchangeable lenses.

It is well known for the single-lens reflex camera using an interchangeable lens that, when a photometric operation is done within the camera through an interchangeably mounted lens with the diaphragm of said lens being fully opened (so-called TTL photometry with fully opened diaphragm), using a resultant value by directly coupling it with an exposure meter or subjecting said value to an automatic exposure control operation would lead to a great error between an exposure value to be set and said photometric value so that a photographing result with a proper exposure would not be obtained.

Such deviation or error is largely classified into one due to optical characteristics of individual lenses interchangeably mounted on a camera and one due to the specific position of the light receiving element within camera. The former is caused by the fact that the lens aperture stopped down by a diaphragm adapted to be preset by a diaphragm preset ring at the moment of photographing cannot produce an accurate multiple proportional variation of actual illumination intensity in the film plane corresponding to a multiple proportional variation of preset diaphragm value marked around the diaphragm preset ring. More specifically, individual interchangeable lenses are different in their lens materials, lens arrangements and assembling modes, so that the illumination intensity in the film plane depends upon the light transmissivity characteristics, a vignetting effect peculiar to each lens, and particularly so-called aperture eclipse occurring with the fully opened diaphragm which substantially reduces the effective illumination intensity in the film plane when the lens aperture is held close to its fully opened diaphragm value. In consequence, the illumination intensity in the film plane is reduced in its effective value and varies in a mode far from said multiple proportional variation as the lens aperture approaches to the fully opened diaphragm value. At the same time, the illumination intensity, which is practically uniform and multiple proportionally varies substantially in correspondence with the successive steps of preset values marked around the periphery of the diaphragm preset ring, can be obtained within a range of relatively small lens aperture values, for example, less than an F-value of 5.6. The effective value of the illumination intensity in the film plane is substantially reduced at the fully opened diaphragm (the maximum lens aperture) and the resultant value of photometric operation carried out at this fully opened diaphragm cannot be utilized to obtain a proper exposure, since it would be impossible, from this resultant value, to produce a multiple proportional variation of exposure exactly or acceptably corresponding to the multiple proportional variation of successive preset values within the range of relatively small lens apertures and thereby to obtain an exposure time corresponding to a preset diaphragm value. Such error appearing in the film plane due to variation of illumination intensity depending upon individual interchangeable objectives is referred to herein as the illumination intensity error in the film plane.

The photometric element exposed to the light coming through the lens with fully opened diaphragm would be preferably located just in the film plane so that said photometric element may be operatively coupled to an exposure meter or utilized for automatic exposure control to obtain a proper exposure. However, if the photometric operation were actually performed just in the film plane, the photometric element would be a critical obstacle for film exposure in photographing and thus the photometric element is located not in the film plane itself, but at a position which is equivalent to said film plane or causes little photometric deviation from the value which would be obtained from the photometric operation performed just in the film plane. Such photometric position equivalent to the film plane could be, for example, a position of a focusing plate on which the light reflected by a mirror is focused and this position is, in fact, preferred in that it is in a conjugate relationship with the film plane. However, this position would be an obstacle not only for the user's view through a viewfinder, but also for the user's focus adjusting operation. Accordingly, the photometric element has usually been located, in most cases, on the light exit end surface of a pentagonal-dachkant-prism or similar optical system for reflection and inversion of light. Such prism has been mounted on the focusing plate, particularly along the periphery of a viewfinder eyepiece so that a viewing therethrough should not be prevented. Even such position of the photometric element has resulted in the problem that a photometric result is obtained as a value slightly lower or darker than the illumination intensity actually given in the film plane. The reason is that the position of the photometric element is deeper than the position of the focusing plate, which is practically equivalent and conjugate to the film plane, by the length of the optical reflection and inversion path defined by said prism, and there occurs less light absorption by said prism. It will be obvious that such location of the photometric element has never achieved the intended photometric effect exactly equivalent to that obtained from the photometric operation performed just in the film plane and has necessarily resulted in an error depending upon the focal distance of each interchangeably mounted lens. An error of this type is referred to herein as the illumination intensity error due to the position of the photometric element.

Thus, the respective errors as above mentioned inevitably appear as various quantities of deviation from the actual photometric values which should be obtained through the fully opened diaphragms no matter whether the objectives have the same value of their fully opened diaphragm or the same focal distance. (Details of these errors are illustrated and described in the specification of Japanese Patent Application No. 41(1966)-49771, which is incorporated fully herein by reference.)

With the photographic camera of so-called diaphragm regulation priority type, it is usual to transmit an information signal corresponding to a preset diaphragm value from the lens to a photometric instrument or its associated circuit or an exposure control circuit in the camera body by suitable mechanical means such as a cam (an example of such means is disclosed in Japanese Patent Publication No. 53(1978)-33064, the disclosure of which is incorporated fully herein by reference) or by suitable electrical compensator means such as a variable resistor control of special arrangement depending upon a diaphragm value actually preset so that exposure control of high precision can be achieved with an effective compensation of the errors as mentioned above, and thereby a proper exposure is given.

SUMMARY OF THE INVENTION

According to one aspect of the invention, compensation is mechanically introduced into an automatic exposure control operation by providing a preliminary displacement, which has no effect on the aperture value. A camera comprises a displaceable actuator and a diaphragm adjustable between a maximum aperture value and a minimum aperture value responsive to displacement of the actuator. A first signal representative of the displacement of the actuator and a second signal representative of the desired aperture value of the diaphragm for correct exposure are generated. The first and second signals are compared. The actuator is displaced upon shutter release. The displacement of the actuator is arrested responsive to the comparison when the first and second signals assume a predetermined relationship. The diaphragm is maintained at the maximum aperture value during an initial portion of the displacement of the actuator, i.e., a preliminary displacement which permits compensation for different types of errors depending upon the amount of the initial portion of the actuator displacement.

According to another aspect of the invention, a camera comprises a camera body and first and second lens assemblies interchangeably insertable into the camera body. Each lens assembly has a displaceable actuator, a diaphragm adjustable between a maximum aperture value and a minimum aperture value responsive to displacement of the actuator and a transducer for generating a first signal representative of the displacement of the actuator. In the camera body, there is generated a second signal representative of the desired aperture value of the diaphragm for correct exposure. The first and second signals are compared and the actuator of the lens assembly inserted in the camera body as displaced responsive to the comparison to stop down the diaphragm from the maximum aperture value toward the minimum aperture value until the first and second signals assume a predetermined relationship. The diaphragm of the second lens assembly is maintained at the maximum aperture value during an initial portion of the displacement of the actuator. Preferably, the initial portion of the actuator displacement is sufficient to compensate for the deviation in aperture value, maximum aperture value, and minimum aperture, between the first and second lens assemblies.

Thus, for any given actual aperture value, the first signal varies from lens to lens depending upon the characteristics of the particular lens mounted on the camera body.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENTS

According to the present invention, various error quantities of the previous mentioned two categories depending upon different objectives interchangeably mounted on a camera body are compensated by a displacement quantity occurring in the mechanically operative system when the operation of stopping down is mechanically transmitted from the camera body to the lens so that the precision of automatic exposure control is effectively improved in an exposure priority mode.

The conception of the invention to achieve such object will now be considered by way of a simplified example. Assuming that, with respect to a lens A having a fully opened diaphragm value of F 1.4 as the reference lens, the light quantity coming through another lens X having a fully opened diaphragm value of F 1.4 and being incident upon the light receiving element corresponds only to the light quantity which will come through said lens A when the latter is stopped down to a value of F 1.7; the light quantity obtained through the lens X is considered to be lower by 0.5 EV than through the reference lens A. If a relationship of $Av' = Bv' + Sv - Tv$ is established with respect to the reference lens A, application of Apex operation $Av = Bv + Sv - Tv$ will give a relationship $Av'' = (Bv' - 0.5) + Sv - Tv$ with respect to the lens X.

For example, conditions are assumed as follows:

| | |
|---|---|
| Brightness of an object to be photographed: | Bv = 8 (EV), |
| Film sensitivity: | Sv = 5 (EV), |
| Exposure time: | Tv = 8 (EV), and |
| | Bv' = 7. |

(It is assumed here that, also concerning the reference lens A, the effective illumination intensity incident on the light receiving element takes a value lower by approximately 1 EV and, even with the fully opened diaphragm value of F 1.4, not Bv'=8 but Bv'=7.).

Calculation according to the above mentioned formulae based on these exemplary values gives respective values of Av, Av', and Av" as follows:

$$Av = 5,$$

$$Av' = 4(EV),$$

$$Av'' = 3.5(EV),$$

wherein Av=5 indicates that the diaphragm value after the operation of stopping down corresponds to F 5.6.

With respect to the reference lens A, if the displacement quantity of the mechanically operative system during the operation of stopping down is provided with a portion for error compensation corresponding to 1 EV as a preliminary displacement quantity of the diaphragm driving member or the transmission member associated therewith that takes no part in the light intensity quantity control effect, the displacement quantity of said diaphragm driving member that actually takes part in the operation of stopping down will substantially correspond to Av'+1=5(EV) and thereby a diaphragm value Av=5 (corresponding to a diaphragm value of F 5.6) will be obtained. The lens X similarly provided with a preliminary displacement corresponding to 1 EV will be stopped down by Av"+1=4.5(EV) to Av=4.5 (corresponding to a diaphragm value of 4.5 after stopped down) with a deviation of 0.5 EV from the reference lens A with respect to the same object to be photographed. To overcome such deviation, the preliminary displacement quantity of the lens X is set 0.5 EV smaller than that of the lens A (set to a quantity corresponding to 0.5 EV) so that the lens X is stopped down by a quantity of Av"+1=4.5 EV to the position Av=5 (corresponding to the diaphragm value of F 5.6) in coincidence with the case of the reference lens A.

The basic conception of the present invention thus lies in achieving the desired error compensation by providing a part of the mechanically operative system adapted to transmit movement of the diaphragm driving member operating in the camera body to the diaphragm blades in the lens with a displacement quantity that takes no part in the light quantity control through the operation of stopping down in operative association with said transmission so that various errors such as the difference of the fully opened diaphragm values (maximum lens apertures), the illumination intensity errors in the film plane depending upon individual objectives, and the illumination intensity errors due to the positions of the respective light receiving elements are properly and reliably compensated with a highly precise diaphragm value as a result of stopping down.

Figure 1:
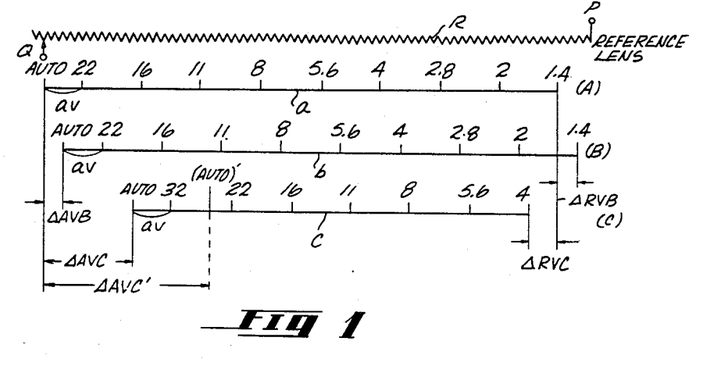
FIG. 1 is a schematic diagram illustrating the relationship between different parameters of a plurality of interchangeable lenses as represented by resistance values selected by a lever operatively associated with a diaphragm preset ring.

Before describing the construction of the present invention in detail, procedures for compensation of said errors will be considered with respect to the photographic camera of diaphragm adjustment priority type and the compensator means according to the present invention will be described along with these procedures for better comprehension. Referring to FIG. 1, R designates a variable resistor provided in the camera body, of which a resistance value is selectively set by a lever operatively associated with a diaphragm preset ring of the respective objective interchangeably mounted on the camera. Specifically, a resistance value of said variable resistor R peculiar to a given preset diaphragm value is set as said diaphragm preset ring is rotated to said given preset diaphragm value. In this connection, reference is made to Suzuki et al Pat. No. 3,486,434, which issued Dec. 30, 1969. The disclosure of this patent is incorporated fully herein by reference. Point or terminal Q of the variable resistor R is adjusted by a diaphragm index member on each particular lens in the manner depicted in the Suzuki et al patent as such lens is installed in the camera body. The position of the index member on each lens establishes the ΔAv value therefor. Even when one objective has the same fully opened diaphragm value as another objective, the respective effective values of illumination intensity in the film plane are different from each other at their fully opened diaphragm values insofar as they are different in their lens designs or other aspect. When they are the same in their fully opened diaphragm values but different in their focal distances, there occurs, in addition to a variation of the illumination intensity error in the film plane, a variation of the illumination intensity error due to the position of the photometric element. As a result, the resistance value of the variable resistor R selected by the lever of each objective at the fully opened diaphragm value should be peculiar to this objective.

In view of the fact that the objectives interchangeably mounted on the camera may be the same both in their fully opened diaphragm values and in their focal distance but different in their lens designs, or the same in their focal distances but different in their fully opened diaphragm values, or the same in their fully opened diaphragm values but different in their focal distances, and so on, one objective which is considered most standard is chosen as the reference lens on the basis of which all the other different objectives are subjected to desired compensation so that the levers operatively associated with the diaphragm preset rings of the respective interchangeable objectives may select proper resistance values at their fully opened diaphragm values. It is obvious that, also with such reference lens (hereinafter referred to as the reference lens A and illustrated as such in FIG. 1), the effective illumination intensity in the film plane is lower than the level according to the associated nominal diaphragm value so far as the fully opened diaphragm value or a range of values adjacent thereto is concerned while a series of multiple proportional diaphragm values within a range of relatively small diaphragm values bring about substantially multiple proportional variation of illumination intensity in the film plane. Obviously, a photometric result is influenced not only by such general characteristics but also by the illumination intensity error due to the position of the photometric element.

Based on the illumination intensity error in the film plane and the illumination intensity error due to the position of the photometric element determined with respect to the reference lens A (for example, having a fully opened diaphragm value of F 1.4), the lever operatively associated with the diaphragm of this reference lens A is adapted to be driven and positioned so that respective preset diaphragm values corresponding to regular interval graduations on the diaphragm preset ring, which are representative of multiple proportional diaphragm values, may result in proper selection of respective resistance values utilized for arithmetic operation of the photometric circuit of the automatic exposure control circuit. Then, a relative positional relationship between the variable resistor R in the camera body, of which the resistance value is selected by the lever operatively associated with the diaphragm value preset ring of the reference lens A as a given diaphragm value is preset, and the diaphragm preset ring a adapted to drive said lever would be as illustrated by (A) of FIG. 1. Under this positional relationship, a lens B being the same in its fully opened diaphragm value F 1.4 but different in the other aspects has its diaphragm preset ring b positioned as illustrated by (B) of FIG. 1 and further, another lens C having a smaller lens opening with its diaphragm preset ring c positioned as illustrated by (C) of FIG. 1. It should be noted here that the positional relationship has been illustrated in FIG. 1 as the relative positions of the respective diaphragm values of the preset rings when the diaphragm values of the respective lenses are preset to their fully opened diaphragm values to facilitate understanding of the various features of the present invention which are described below.

By adjustably rotating the diaphragm preset ring of the respective lenses A, B, and C from such relative positional relationship, both the illumination intensity error in the film plane and the illumination intensity error due to the position of the photometric element are so effectively compensated that not only is a photometric signal corresponding to the actual illumination intensity in the film plane produced through the fully opened diaphragm transmitted to an arithmetic section of the photometric circuit or the exposure control circuit but also a given diaphragm value preset by rotating the diaphragm preset ring from the fully open position properly brings about a correspondingly multiple-proportional value of exposure.

Such method of error compensation falls under a classification in which the information on diaphragm value applied to the arithmetic section of the exposure control circuit according to the diaphragm value priority mode is replaced by a resistance value selected by a given preset diaphragm value. When this method of error compensation is applied to the shutter speed priority mode in which an exposure time is set with priority and then the objective is stopped down to a diaphragm value corresponding to a resistance value which will give a proper exposure, the result will be as follows. The resistance value given as a result of such stopping down already includes an effective compensation of both the illumination intensity error in the film plane and the illumination intensity error due to the position of the photometric element and, accordingly, this resistance value may be utilized as an arithmetic factor for automatic exposure regulation to introduce a quantity of actuation for automatic diaphragm control. On the assumption that the same diaphragm preset ring as used for the diaphragm priority mode is utilized, a preset position for automatic diaphragm control is selected on said diaphragm preset ring at a predetermined angular or rotational distance (corresponding to $a_v$ as illustrated and in this case, $a_v \geq 0$) from the rotational position for the fully closed diaphragm value so that both the illumination intensity error in the film plane and the illumination intensity error due to the position of the photometric element may be effectively compensated for in operation of stopping down. Such preset position for automatic diaphragm control depends upon individual interchangeable objectives as illustrated by FIG. 1, in which the diaphragm preset ring a of the reference lens A has its automatic diaphragm control marking (Auto) at an angular distance $a_v$ from the marking of the fully closed diaphragm value F 22. The diaphragm preset ring b of the lens B, which has the same fully opened diaphragm value and fully closed diaphragm value as the reference lens A, has a lever operatively associated with the diaphragm of lens B, which by its position compensates for the illumination intensity error in the film plane and the illumination intensity error due to the position of the photometric element. The ring b bears its peculiar preset position for automatic diaphragm control (Auto) at an angular distance $\Delta AvB$ from the corresponding position for the reference lens A. Similarly, the diaphragm preset ring c of the lens C has its peculiar preset position (Auto) for automatic diaphragm control at an angular distance $\Delta AvC$ from the corresponding preset position for the reference lens A when the fully closed diaphragm value is at F 32 and at an angular distance $\Delta Av'C$ when the fully closed diaphragm value is at F 22. As will be readily understood, these angular distances or deviations or $\Delta Av$ in general, are determined depending not only upon the deviations ($-\Delta RvB$ for the lens B and $\Delta RvC$ for the lens C) due to different points of starting the operation which are, in turn, determined by different fully opened diaphragms and other characteristics peculiar to the respective objectives interchangeably mounted on the camera but also upon the different fully closed diaphragm values marked on the respective diaphragm preset rings.

According to the present invention, therefore, the deviation due to different fully closed diaphragm values depending upon the respective interchangeable lenses is transmitted from the lens interchangeably mounted on the camera to the camera body as an information signal for the automatic exposure control in the exposure time priority mode (so-called shutter priority mode). Further, the deviations such as $\Delta RvB$ and $\Delta RvC$ ($\Delta Rv$ in general), which can be known in advance, inclusive of the different fully opened diaphragm values depending upon the respective lenses interchangeably mounted on the camera, the illumination intensity errors in the film plane, and the illumination intensity errors due to the position of the light receiving element, are replaced by a compensation value as a portion of the displacement quantity occurring in the mechanically operative system of the respective interchangeable lens functioning from the camera body towards the diaphragm blades, so that automatic exposure control can be realized at a high precision.

From the basic conception as mentioned above, an arithmetic expression established when the diaphragm preset ring has been set to the automatic diaphragm control position (Auto) will be considered. This expression is given in the following form according to the exposure time regulation priority mode (or the shutter priority mode), assuming that all the units are represented by EV values.

$$Av = Bv' + Sv - Tv + \Delta Av - \Delta Amin + 1 \tag{1}$$

wherein:
  Av: diaphragm value;
  Bv': brightness value of object to be photographed after transmission through the objective;
  Sv: sensitivity value of film used for photographing;
  Tv: shutter speed value set with priority;
  $\Delta Av$: deviation from reference lens A;
  $\Delta Amin$: difference between the fully closed diaphragm value of the reference lens A and the fully closed diaphragm value of each lens interchangeably mounted on the camera; with respect to the fully closed diaphragm value F 22 of the reference lens A, as illustrated by FIG. 1, $\Delta Amin = 0$ when the lens to be mounted on the camera has a fully closed diaphragm value of F 22 while $\Delta min = -1$ when the lens to be mounted on the camera has a fully closed diaphragm value of F 32, and such information is transmitted from the lens to the arithmetic circuit in the camera body as the deviation or difference signal simultaneously when the lens is interchanged. (1 is the EV value given relative to the fully opened diaphragm value F 1.4 of the reference lens A.)

Compensation for the illumination intensity error in the film plane and the illumination intensity error due to the position of the photometric or light receiving element has already been incorporated into the diaphragm value Av obtained by the previously mentioned expression (1). In the case in which the diaphragm value is preset by rotation of the diaphragm preset ring in the diaphragm value priority mode, instead of relying upon the automatic diaphragm control (Auto), the shutter speed can be obtained by mutually transferring the terms Av and Tv in said expression (1), namely $$Tv = Bv' + Sv - Av + \Delta Av - \Delta Amin + 1 \qquad (2)$$

The exposure control and its value may be used for display within the viewfinder.

Operation of the automatic diaphragm control is accomplished when a member provided in the camera body operatively associated with the shutter release drives a release plate in the lens and thereupon the release plate is displaced from a position at which the diaphragm mechanism is held fully opened to a position at which said diaphragm mechanism reaches a given EV value. A displacement quantity of said release plate is in linear proportion to a quantity of stopping down and, therefore, the Av value obtained from said expression (1) cannot be directly utilized as a control value for the diaphragm. When a value, for example, Av=5 (F 5.6) is used as the arithmetic operation value for the diaphragm control, stopping down by a quantity of 4 EV results in stopping down to F 5.6 for an objective having its fully opened diaphragm value of F 1.4 (Av=1). In this case, when the fully opened diaphragm value of the lens is F 4 (Av=4), F 5.6 (Av=5) can be obtained by stopping down of the lens to an amount corresponding to 1 EV. Thus, the EV quantity necessary for a desired quantity of stopping down is obtained in the form of a difference or deviation between the EV value as a result of arithmetic operation and the fully opened diaphragm expressed in EV value, and the Pv expressed in EV value as the control quantity is given by the following formula:

$$Pv = Bv' + Sv - Tv + \Delta Av - \Delta Amin + 1 - Amax \qquad (3)$$
$$= Av - Amax$$

wherein Amax represents the EV value at the fully opened diaphragm depending upon individual lenses interchanged.

It will be obvious from the above formula that the Pv expressed in EV value as the control quantity depends upon the fully opened diaphragm values of the respective lenses, which determine a precision of said control quantity Pv. Accordingly, when a particular lens is mounted on the camera it is required to transmit the fully opened diaphragm value peculiar to the lens from the lens to the camera body as a signal which identifies this lens.

Generally, the objective preferably has a large value of its fully opened diaphragm to be used for photographing, since it provides a viewfinder image sufficiently bright to detect an exactly focused point during focus adjustment as well as for viewing the composition of a scene. It also enlarges the range of stopping down, and thereby enlarges the exposure range that can be photographed. However, this preferable condition is adversely limited by the requirement for various aspects such as optical characteristics and lens size. Thus, it will be practically difficult and even disadvantageous to extract Amax signals in said formula (3) for all the interchangeable lenses and to transmit them to the camera body, in view of factors such as required space, cost, and reliability.

To overcome such problem, the present invention proposes that an error in the automatic diaphragm control due to the differences of the fully opened diaphragm values, the illumination intensity error in the film plane, which is characteristic of each lens, and the illumination intensity error due to the position of photometric element, be compensated by a special operation of the member taking part in the diaphragm control, namely, the diaphragm driving member in the camera body or a member operatively associated therewith to bring the diaphragm mechanism to a position corresponding to the desired diaphragm value.

The term "a special operation" used herein means the part in the course of the operation of an operative system starting from said diaphragm driving member in the camera body and terminating in the diaphragm blades that directly takes no part in stopping said diaphragm blades down to the desired diaphragm value. This operation taking no part directly in stopping down will be referred to herein as a "preliminary displacement" and a quantity of displacement of the members constituting said operative system during said operation taking no part in stopping down, namely, before the operation for stopping down the diaphragm blades actually starts to stop the lens aperture down beyond the fully opened diaphragm to the desired value for control of the light quantity, will be referred to herein as a "quantity of preliminary displacement."

Substitution of $$\Delta Av - \Delta Amin + 1 - Amax = \Delta Rv \qquad (6)$$

into said formula (3) and replacement of the value corresponding to $\Delta Rv$ depending upon the individual lenses by said quantity of preliminary displacement make disappear the Amax signal corresponding to the EV value depending upon the fully opened diaphragm value from said formula (3) and the EV value of Pv as a control quantity is given by $$Pv = Bv' + Sv - Tv + \Delta Rv \qquad (5)$$

Such aspect will be considered with respect to the lenses C and B of FIG. 1. The preliminary displacement quantity of the lens C may be set larger by $\Delta RvC$ with respect to the lens A and the preliminary displacement quantity of the lens B may be set smaller by $\Delta RvB$ with respect to the lens A to eliminate the deviation due to different values of the respective fully opened diaphragms, the light intensity error in the film plane depending upon the individual objectives, and the light intensity error due to the position of the photometric element.

Figure 2:
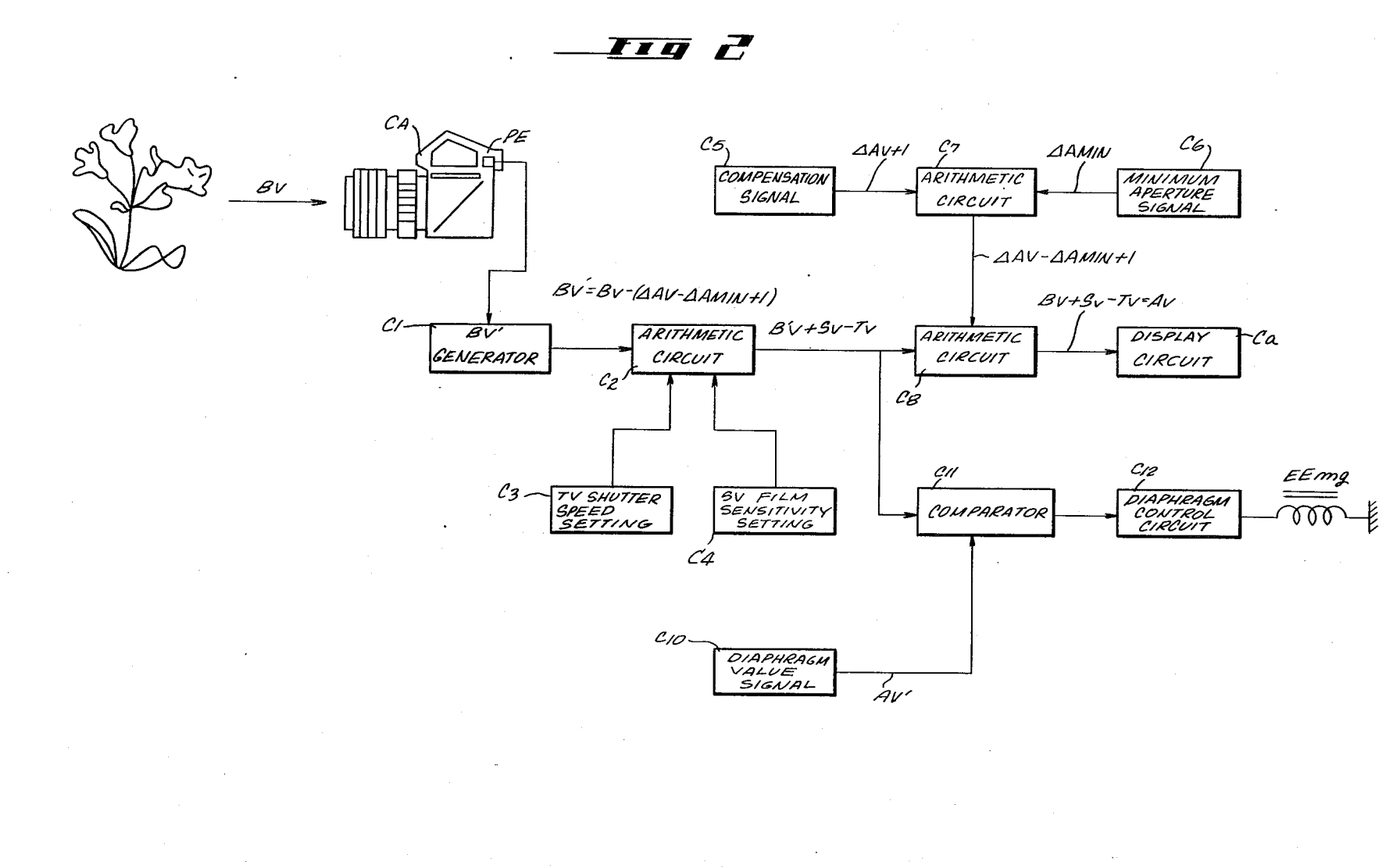
FIG. 2 is a block schematic diagram of an automatic diaphragm control system incorporating the principles of the invention.

An example of a single-lens reflex camera in which the automatic diaphragm control is effected according to such arithmetic formula is illustrated by FIG. 2, wherein CA designates a camera and Bv designates the brightness of an object to be photographed. It has previously been mentioned that a light quantity coming from the object having its brightness Bv through the objective and to which a photometric element PE is exposed takes an inherent value depending upon a fully opened aperture of this lens, a light absorption coefficient, an internal reflection and vignetting effect of this lens, and other factors. An output provided from the photometric element PE is log-compressed by a Bv' generator $C_1$ in the form of $$Bv' = Bv - (\Delta Av - \Delta Amin + 1) \tag{6}$$

and then applied to an arithmetic circuit $C_2$, which is also applied with an information signal Tv based on the exposure time (shutter speed) set with priority and another information signal Sv based on the sensitivity of the film in use from a shutter speed regulating member $C_3$ and a film sensitivity regulating member $C_4$, respectively. Thus, the arithmetic circuit $C_2$ provides a resultant information signal as follows:

$$Bv' + Sv - Tv \tag{7}$$

When an interchangeable lens is mounted on the camera CA and its diaphragm preset ring is rotated to the automatic diaphragm control position (Auto), a value $\Delta Av$ peculiar to this lens and a constant value 1 added thereto through circuit processing is $$\Delta Av + 1 \tag{8}$$

which is the output from a compensation signal member $C_5$ and input to an arithmetic circuit $C_7$. The arithmetic circuit $C_7$ is also supplied with an information signal $$\Delta Amin \tag{9}$$

which corresponds to a deviation of a fully closed diaphragm value peculiar to this lens from the fully closed diaphragm value of the reference lens A from a minimum aperture signal member $C_6$. As a result, the arithmetic circuit $C_7$ provides a resultant output $$\Delta Av - \Delta Amin + 1 \tag{10}$$

This output is applied together with the output expressed by the formula (7) coming from said arithmetic circuit $C_2$ to an arithmetic circuit $C_8$ in which an arithmetic operation (7)+(10) is performed.

$$Bv' + Sv - Tv + \Delta Av - \Delta Amin + 1 = Av$$

Substitution of Bv' from the formula (6) gives $$Bv + Sv - Tv = Av \tag{11}$$

and thus it is possible to obtain an Apex quantity Av of the diaphragm value.

Such Av value can be displayed within a viewfinder by a display circuit $C_9$ consisting, for example, of a meter. The information signal Av subjected to this display merely indicates a diaphragm value providing a proper exposure with respect to the exposure time (shutter speed) set with priority but not the automatic control quantity as it has previously been mentioned. To effect stopping down with the automatic diaphragm control quantity Pv in operative association with the operation of the shutter release, said output (7) provided from the arithmetic circuit $C_2$ and the diaphragm value signal Av' formed by a diaphragm value signal generator member $C_{10}$ according to the diaphragm value of the lens are applied to a comparator circuit $C_{11}$ so that both these signals are compared to each other in said comparator circuit and, when the output Av' reaches said output Av, the coincidence signal output is applied to a diaphragm control circuit $C_{12}$ and thereby a diaphragm control magnet EEmg is released, with an effective result that the diaphragm value is adjusted to said Av corresponding to the arithmetic result.

A voltage source is connected across variable resistor R and the signal $\Delta Av$ is the voltage between points Q and P of resistor R, which is the input to compensation signal member $C_5$.

Minimum aperture signal member $C_6$ could comprise a voltage source and a resistor in the camera body connected through contacts discussed below in connection with FIG. 5 in series with a $\Delta Amin$ representative resistor in the particular lens. The minimum aperture signal is the voltage appearing across the $\Delta Amin$ representative resistor of the particular lens.

Figure 6:
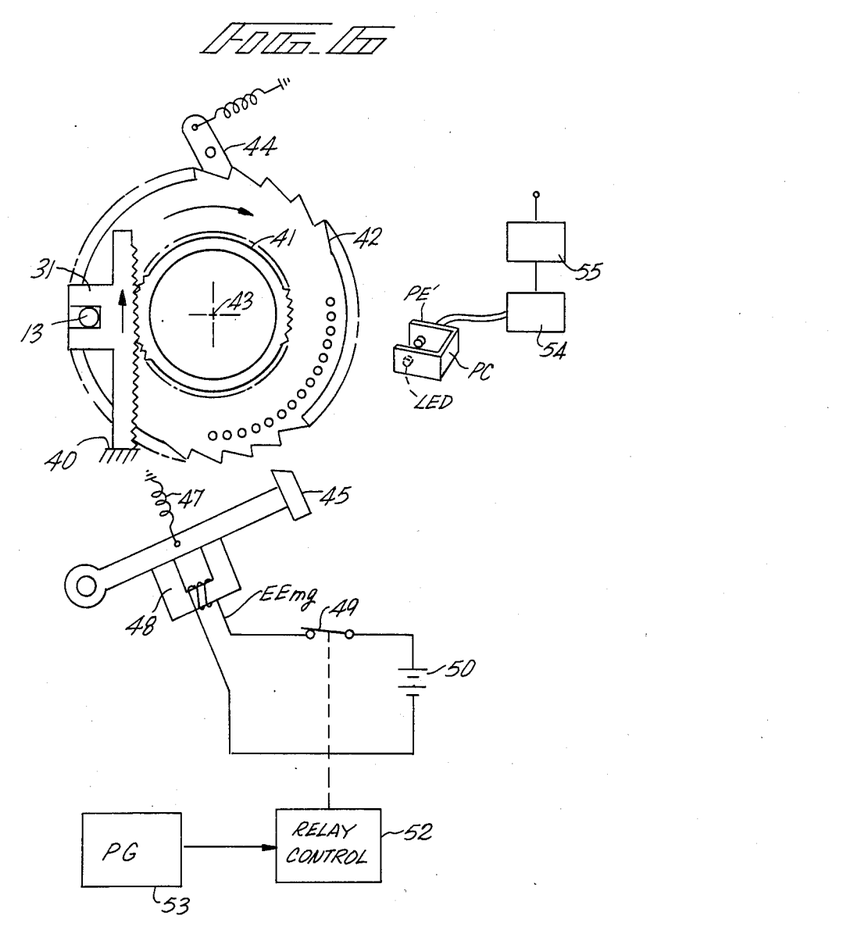
FIG. 6 is a schematic diagram of a diaphragm actuator and displacement transducer therefor.

After the shutter release of the camera is actuated, the value of Bv' produced by generator $C_1$ remains fixed for the rest of the automatic exposure control operation. Thus, generator $C_1$ produces a static signal. Diaphragm value signal is input by a photo-coupler which consists of an LED and a PE' (another photometric element, not the same as PE) as shown in FIG. 6. The number of pulses from PE' is in proportion to Av'. During the automatic exposure control operation, while the inputs to comparator 13 differ, the diaphragm stops down from its maximum value responsive to diaphragm control magnet EEmg. When the inputs to comparator $C_{13}$ are equal, a stop signal is generated to fix the diaphragm value.

Figure 3:
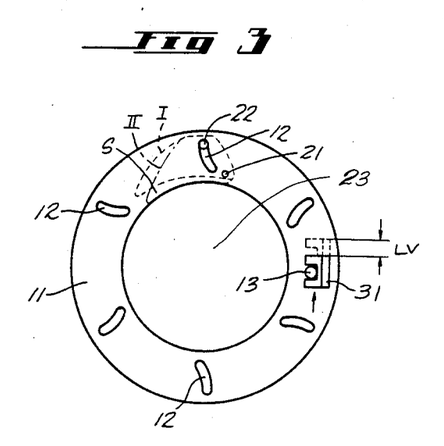
FIG. 3 is a rear view of a diaphragm mechanism illustrating the use of a preliminary displacement that does not affect the aperture value of the diaphragm.

FIG. 3 illustrates by way of example an arrangement in which said preliminary displacement occurs in a part of the members constituting the operative system interposed between the diaphragm driving member in the camera body and the diaphragm blades in the lens before said diaphragm blades begin to be moved from the fully opened position to the desired stopped down position for control of the light quantity.

Referring to FIG. 3, S designates one of diaphragm blades, which together form an iris diaphragm, and 11 designates a diaphragm blade actuating ring, which rotates the diaphragm blades S around an associated pivot pin 21. Said diaphragm blade actuating ring 11 itself is adapted to be rotated around the optical axis with respect to a stationary part of the lens barrel. The numeral 12 designates a plurality of cam grooves formed in said diaphragm blade actuating ring 11 and a stationary pin 22 on each blade S is adapted to ride in each groove. On the side of said diaphragm blade actuating ring 11 there is mounted a pin 13 adapted to engage a release plate 31 which is, in turn, driven by the diaphragm driving member actuated in the camera body in operative association with the operation of the shutter release. The diaphragm blade actuating ring 11 is biased by a spring in the direction opposed to the direction indicated by an arrow in FIG. 3 so that said diaphragm blade actuating ring 11 normally tends to open the iris diaphragm toward its fully opened position. The position of the release plate 31 as illustrated corresponds to the starting position of this release plate 31, at which each diaphragm blade S takes its positions I indicated by broken lines. The inner edge of each diaphragm blade S is situated behind ring 11 so as not to protrude into a circular opening 23 in ring 11, which defines the maximum aperture of this lens. From this position, each diaphragm blade S is rotated around the respective pivot pin 21 with its associated pin 22 being guided along the associated cam groove 12 as the release plate 31 is urged upwardly by the diaphragm driving member or a transmission member thereof in the direction indicated by the arrow and thereby the diaphragm blade actuating ring 11 is rotated via the pin 13, until each diaphragm blade S reaches its position II indicated by phantom lines, at which its inner edge is brought into coincidence with the periphery of said circular opening 23. The position II of each blade S corresponds to the positions of blades of the fully opened diaphragm. Further rotation of the diaphragm blade actuating ring 11 actually begins to stop the lens down beyond the position II of each diaphragm blade S. Thus, during movement from the position I to the position II, the respective diaphragm blades S have no function of incident light quantity control and movement of the release plate 31 does not actually cause the diaphragm to stop down. The operation of said release plate 31 from the starting position to the position illustrated by phantom lines corresponds to the preliminary displacement which is an important feature of the present invention and the quantity of the preliminary displacement is given as Lv. Thus, in this embodiment, ring 11 serves two functions—to actuate rotation of blades S and to mask blades S during the preliminary displacement so there is no change in diaphragm value, i.e., no light quantity control. Although the quantity of preliminary displacement, Lv, occurs as a relative movement of the release plate 31 and the diaphragm blades S in the embodiment as illustrated in FIG. 3, this may be set as a relative movement between the diaphragm driving member in the camera body and said release plate 31, such as for example by means of a lost motion linkage between a displaceable actuator and release plate 31; the displacement transducer, generator $C_{10}$, is connected to the actuator and the amount of lost motion varies from lens to lens to provide the desired Lv.

To provide the individual lenses, for example, the lenses B and C, with respective preliminary displacement quantities Lv, these quantities may be selected so that $Lv = \alpha - \Delta RvB$ for the lens B while $Lv = \alpha + \Delta RvC$ for the lens C, as it has previously been mentioned, when the reference lens A has its quantity of preliminary displacement expressed by $Lv = \alpha$.

However, these quantities of preliminary displacement thus selected are based on the assumption that the operative system provided on the respective interchangeable lens to effect the operation of stopping down is free from a mechanical load during the actual operation of stopping down and there occurs no time delay due to this mechanical operative system. In fact, it has been found that the mechanical operative system for stopping down is accompanied by a mechanical time delay particularly in the time period from application of a signal to terminate stopping down to the actual termination thereof, and such mechanical time delay must be considered in arrangement of said mechanical operative system.

Figure 4:
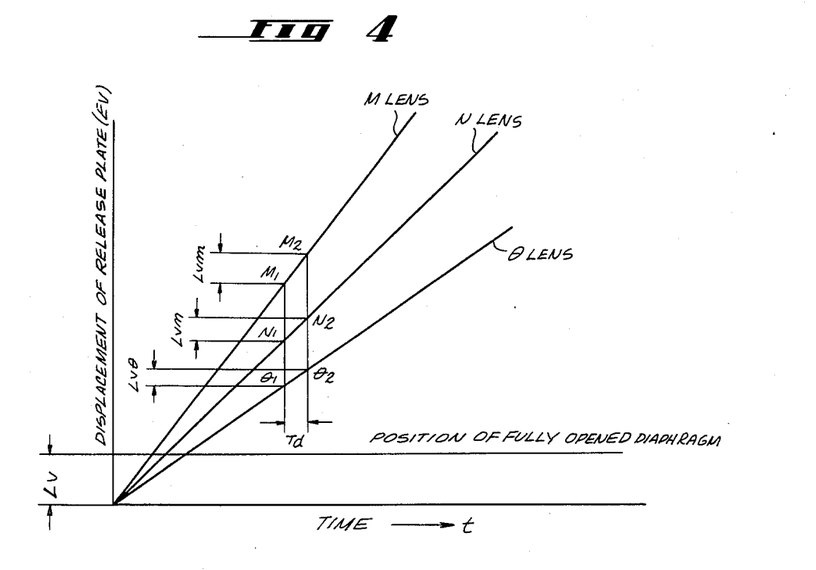
FIG. 4 is a graph illustrating the relationship between delay time and stopping distance of a plurality of interchangeable lenses.

FIG. 4 illustrates a diaphragm schematically showing such a lag or delay in the mechanical operative system. A displacement quantity of the release plate 31 is given in EV value by the axis of ordinate and a time required for stopping down is given by the axis of abscissa. When a relative linear relationship is given between the displacement quantity of the release plate 31 and the diaphragm value obtained from stopping down by said displacement quantity, variation in diaphragm values depending upon the displacement quantities of the release plate 31 is not always uniform due to various factors such as a biasing force of the spring normally striving to urge the diaphragm blades back to their fully opened positions, inertia and frictional loads of the respective operative members. Thus, the lenses are practically classified into three types, i.e., a high speed lens M, an average speed lens N, and a low speed lens $\theta$. FIG. 4 shows the respective characteristic lines of these three types of lenses. Strictly, a variation of speed appears in movement of the release plate 31 itself during a period from start to stop thereof and particularly the release plate 31 moves at a low speed immediately after its start. However, such variation is negligible relative to the automatic diaphragm control operation by the release plate 31 as a whole, since it is during said preliminary displacement that such speed variation occurs and has little influence upon the control result even when this is approximately looked upon as a linear variation. Therefore, tendencies of the respective lenses of three types are linearly shown. A straight line extending in parallel to the axis of abscissa indicates the preliminary displacement quantities Lv of the release plate 31 until the diaphragm blades reach their positions corresponding to the fully opened diaphragm values of the respective lenses. With respect to the lens M in the diagram, if the release plate 31 is supplied with a stop signal at a moment of a time $M_1$ elapsing after the release plate 31 has started, the diaphragm blades are actually stopped at a later moment $M_2$. Similarly, with the lens N, if the release plate 31 is applied with a stop signal at a moment $N_1$, the diaphragm blades are stopped at a later moment $N_2$ and, in the case of the lens $\theta$, the diaphragm blades are stopped at a later moment $\theta_2$ with a stop signal applied to the release plate 31 at a moment $\theta_1$. Accordingly, no matter which type the lens belongs to, there occurs a time delay Td from application of the stop signal until the diaphragm blades actually stop. This means that to stop the diaphragm blades exactly at the moment corresponding to the desired diaphragm value, said stop signal must be applied to the release plate a moment earlier than the desired moment by such time delay Td due to the mechanical system or it would result in a stopping down in excess of the extent required for automatic diaphragm control. In other words, the different lenses stop down different amounts after application of the stop signal.

The present invention proposes a countermeasure to this problem, too.

Referring again to FIG. 4, the quantity of stopping down achieved during the time delay Td due to the mechanical operative system depends upon the type of lens and such quantity can be compensated for by the corresponding displacement quantity of the release plate 31 as follows:

Lens $M \ldots Lvm$;

Lens $N \ldots Lvn$; and

Lens $\theta \ldots Lv\theta$.

It will be understood that the higher the speed of operation the lens has, the larger the quantity of stopping down made after application of the stop signal.

Now, setting the circuit in the camera body for generation of the stop signal on the basis of the lens N having the average speed of operation, i.e., so that said circuit generates the stop signal earlier by a quantity Lvn with respect to the displacement quantity of the release plate 31, would result in actual quantities of stopping down excessive by $Lvn - Lv\theta$ for the lens $\theta$; and
insufficient by $Lvm - Lvn$ for the lens M.

Thus, the corresponding errors of diaphragm control would prevent achievement of the proper exposure. Also uniformly setting $Lv = Lvn$ on the basis of said preliminary displacement quantity Lv depending upon the fully opened diaphragm value of the lens N having the average speed of operation would result in diaphragm control errors corresponding to said deviations even when the lenses having the same fully opened diaphragm value, so far as their speeds of operation are different due to the mechanical constructions peculiar to these lenses. Accordingly, the errors in quantities of stopping down corresponding to the respective time delays must be compensated for independently of the gradient of the characteristic line by setting the preliminary displacement quantities taking into consideration the time delays due to the mechanical systems of the respective types of lens as follows:

$Lv = Lvm$ for the lens M;
$Lv = Lvn$ for the lens N; and
$Lv = Lv\theta$ for the lens $\theta$.

FIG. 6 shows the interconnection between diaphragm control magnet EEmg and release plate 31. Release plate 31 is guided by means not shown to move straight in accordance with movement of the pin 13 working in the camera body side. The position of a stop 40 in the path of release plate 31 varies from lens to lens and determines the Lv value of the particular lens. Release plate 31 has teeth that mesh with teeth on a spur gear 41. An annular member (blade actuating ring 11) incorporating a spur gear 41 and a ratchet 42 is guided for rotation by an annular guide member within the lens housing. The center of rotation of said annular member is indicated with a reference number 43 in FIG. 6. Said annular member having spur gear 41 and a ratchet 42 is provided with many small holes for pulse counting. Said holes are arranged along the circumference with the center 43 of rotation as its center. A displacement transducer in the form of a photocoupler PC consists of a light emitting diode LED and a photometric element PE′ positioned opposite to each other. The holes in the annular member pass in an arcuate row between the light emitting diode and the photometric element PE′. When the ratchet 42 is moved by movement of the release plate 31, pulse signals proportional in number to the angular displacement of the annular member are generated by the rotation of said ratchet 42. These pulse signals are applied to a pulse counter 54. In an analog indication of the angular displacement as desired, the output of counter 54 could be applied to an A-D converter 55. Either way, a signal proportional to Av′ is derived from pulse counter 54, and carries out diaphragm control action through the comparison circuit. A pawl 44 prevents rotation of ratchet 42 in a counterclockwise direction as viewed in FIG. 6 and therefore also corresponding rotation of spur gear 41 and release plate 31 during the automatic exposure and shutter release operation. When the shutter is reset for the next photograph, pawl 44 is disengaged from ratchet 42 to permit release plate 31 to return to stop 40. Pin 13 and release plate 31 are located in the lens, and spur gear 41, ratchet 42, shaft 43, and pawl 44 are located in the camera body. A ratchet advancing tooth 45 is located in the camera body with magnet EEmg. Tooth 45 is mounted on the end of a magnetic pivot arm 46 biased into engagement with ratchet 42 by a spring 47. Magnet EEmg is wrapped around an armature 48 in proximity to pivot arm 46. Diaphragm control circuit $C_{14}$ includes a switch 49 and a battery 50 in series with magnet EEmg. Switch 49 is opened and closed responsive to comparator $C_{14}$. When switch 49 closes, as shown in FIG. 6, pivot arm 46 is drawn against armature 48, thereby disengaging tooth 45 from ratchet 42. When switch 49 opens, spring 47 pulls pivot arm 46 away from armature 48, thereby driving tooth 45 against ratchet 42 to advance it one increment. Switch 49 is actuated by a relay control 52, such as a solenoid, which is driven by a pulse generator 53. Each time a pulse is supplied to relay control 52 by pulse generator 53, switch 49 opens to advance ratchet 42 one increment. Pulse generator 53 begins sending pulses to relay control 52 when the shutter release is actuated and stops sending pulses to relay control 52 when comparator $C_{13}$ indicates equality between the two signals applied to its inputs. Accordingly, displacement of ratchet 42, and thus blade actuating ring 11, is arrested responsive to comparator $C_{13}$, when the two signals applied to its inputs are equal.

To illustrate how the quantity of preliminary displacement Lv can compensate for the characteristics of different lenses, assume that a lens M is displaced more than a reference lens N after a stop signal is generated by a quantity $\Delta Lv = Lvm - Lvn$. If such displacement $\Delta Lv$ corresponds to an angular displacement of three holes on the annular member, stop 40 is so positioned that for lens M three more holes on its annular member pass photocoupler PC before the diaphragm blades protrude into the opening of the annular member than for lens N. Stated differently, if 30 holes on the annular member of lens N pass photocoupler PC as the diaphragm stops down from the maximum value to a given smaller value, stop 40 on lens M would be so positioned that 27 holes on its annular member pass photocoupler PC as the diaphragm stops down from the maximum value to the same given value, assuming the characteristics of lenses M and N are otherwise identical. Although the same number of holes on the annular member pass photocoupler in both cases, for lens M fewer pass after the diaphragm blades protrude into the opening of the annular member, i.e., after rotation of the annular member changes the diaphragm value. The other errors referred to above are compensated for in similar fashion, i.e., fewer or more holes on the annular member pass photocoupler PC before the diaphragm blades protrude into the opening of the annular member, depending upon the extent of correction, i.e., compensation to be effected by the position of stop 40.

Since the initial rotation of the diaphragm actuating ring, which corresponds to the preliminary displacement prescribed for the particular lens, does not result in any reduction of the aperture value, a number of the pulses stored in the counter do not correspond to actual reduction of the aperture value, but instead correspond to the characteristics of the particular lens, thereby providing compensation for different lens characteristics from lens to lens.

With reference to equation 4 above and FIG. 2, the value of Av' produced by generator $C_{10}$ is already compensated for by $\Delta Rv$. Thus, in contrast to the arrangement disclosed in copending application Ser. No. 229,879, $B_v'$ rather than $B_v$ can be used for comparison in comparator $C_{11}$, and it is not necessary to process Amax in an arithmetic circuit with the signal generated by the displacement transducer in the lens housing, because $\Delta Av$, $\Delta Amin$, and $\Delta Amax$ are all accounted for in the preliminary displacement. Thus, by virtue of the preliminary displacement, which does not change the aperture value, the signal produced by generator $C_{10}$ is compensated for deviations of the lens from the reference lens, i.e., $\Delta Av$, $\Delta Amin$, and $\Delta Amax$, as well as other aspects if desired.

Figure 5:
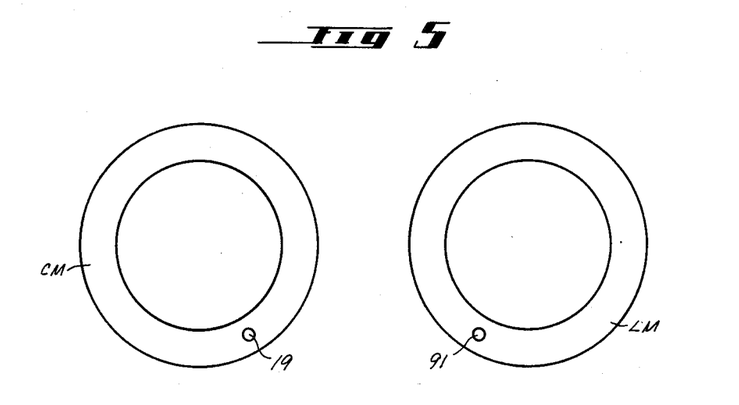
FIG. 5 is a front view of a camera body and a rear view of an interchangeable lens illustrating the mounts on such camera body and lens with electrical contacts.

With respect to the camera and the objective according to the automatic diaphragm control mode which is incorporated with the compensation for a difference in the fully opened diaphragm values of the respective lenses interchangeably mounted on the camera and the compensation for a difference in the speeds of stopping down operation thereof, a preferred embodiment of the lens mounting arrangement by which the signal characterizing individual lenses is transmitted from the lens to the camera body is illustrated by FIG. 5.

Referring to FIG. 5, a portion designated by reference symbol CM corresponds to a mount on the camera for mounting of an objective while a portion designated by reference symbol LM corresponds to a mount on the lens. Both the mount CM on the camera body and the mount LM on the lens are shown at their surface along which they are mutually abutted, namely, the mount CM is shown as seen from the camera front while the mount LM is shown as seen from the rear side of the lens. Both the mounts are provided with a pair of opposed contacts by which ON and OFF signals are transmitted in the form of binary codes or electric current is transmitted depending upon an electrical factor such as resistance value which is, in turn, determined by the fully closed diaphragm value. According to the present invention, there are provided a pair of contacts 19 and 91 through which the information on the fully closed diaphragm value depending upon the individual interchangeable lens mounted on the camera and on the automatic diaphragm control position (Auto) determined by said fully closed diaphragm value is transmitted from the lens to the camera body. It is through this pair of contacts that the $\Delta Amin$ signal determined by said fully closed diaphragm value is transmitted from the lens to the camera body. This pair of contacts constitutes a part of the fully closed aperture signal generating member $C_6$ shown in FIG. 2.

As will be obvious from the foregoing detailed description, the present invention enables the operation of stopping down at the highest precision by automatic diaphragm control through the operation of stopping down which already includes therein the compensation by a simple mechanism of both the illumination intensity error in the film plane appearing due to the illumination intensity variation and the illumination intensity error due to the position of the photometric element depending upon individual interchangeable lenses mounted on the camera. The provided mechanism serves to stop down with a compensating preliminary displacement taking no part in the actual stopping down effect for the interchangeable lenses on the other hand. Concerning said preliminary displacement quantity, a delay occurring in the mechanical operation determined by the different speeds of stopping down, which depends, in turn, upon the individual lens interchangeably mounted on the camera, is also considered and thereby said preliminary displacement quantity is further finely adjusted so that the automatic exposure control can be achieved with an extremely high precision including therein the effective compensation of the deviations caused by all the factors depending on the individual lenses. In spite of achievement of such high precision exposure control, the present invention advantageously simplifies the mount construction along which the interchangeable lens is coupled to the camera body, since it is unnecessary, in accordance with the present invention, to transmit the information signal related to the fully opened diaphragm of the respective lens from the latter via the lens mount to the camera body so as to be incorporated into the regulating factors for the exposure control circuit. The exposure control circuit is also simplified in its construction according to the present invention; specifically, no means is required to change over the fully opened diaphragm signal in order to compensate the change of F value when a zoom lens accompanied with said change of F value is mounted on the camera. The present invention accordingly provides the desired interchangeable lens single-lens reflex camera of automatic exposure control type, which is simple as well as compact in its overall construction, and obtainable at a low cost and almost trouble-free.

What is claimed is:

1. A camera comprising:
   a displaceable actuator;
   a diaphragm adjustable between a maximum aperture value and a minimum aperture value responsive to displacement of the actuator;
   means for generating a first signal representative of the displacement of the actuator;
   means for generating a second signal representative of the desired aperture value of the diaphragm for correct exposure;
   means for comparing the first and second signals;
   means for displacing the actuator upon shutter release;
   means for maintaining the diaphragm at the maximum aperture value during an initial portion of the displacement of the actuator after which the diaphragm stops down from the maximum aperture value toward the minimum aperture value as the actuator is displaced; and
   means responsive to the comparing means for arresting the displacement of the actuator when the first and second signals assume a predetermined relationship.

2. The camera of claim 1, in which the diaphragm comprises a plurality of blades continuously rotatable responsive to displacement of the actuator, the blades together defining an opening decreasing in size during actuator displacement and the maintaining means comprises a ring masking the diaphragm blades during their rotation responsive to the initial portion of the displacement of the actuator, the ring defining the maximum aperture value.

3. The camera of claim 1, in which the predetermined relationship between the first and second signals is equality.

4. The camera of claim 1, in which the camera additionally has a lens for receiving light passing through the diaphragm and the first signal generating means comprises a photometric element positioned to receive light passing through the lens, the photometric element producing a light quantity representative signal and means for logarithmically compressing the light quantity representative signal, and means for modifying the compressed signal to reflect the desired shutter speed and film sensitivity.

5. The camera of claim 4, additionally comprising a camera body and a lens housing, the diaphragm, lens, and first signal generating means being disposed in the lens housing.

6. A camera comprising:
a camera body;
first and second lens assemblies interchangeably insertable into the camera body, each lens assembly having a displaceable actuator, a diaphragm adjustable between a maximum aperture value and a minimum aperture value responsive to displacement of the actuator, and means for generating a first signal representative of the displacement of the actuator;
means in the camera body for generating a second signal representative of the desired aperture value of the diaphragm for correct exposure;
means for comparing the first and second signals;
means for displacing the actuator upon shutter release;
means in the second lens assembly for maintaining the diaphragm at the maximum aperture value during an initial portion of the displacement of the actuator after which the diaphragm stops down from the maximum aperture value toward the minimum aperture value as the actuator is displaced; and
means responsive to the comparing means for arresting the displacement of the actuator when the first and second signals assume a predetermined relationship.

7. The camera of claim 6, in which the comparing means and the displacing means are located in the camera body.

8. The camera of claim 7, in which the initial portion of the actuator displacement compensates for deviations in the diaphragm value, $\Delta Av$, the maximum aperture value, $\Delta Amax$, and the minimum aperture value, $\Delta Amin$, of the first lens assembly from the second lens assembly.

9. The camera of claim 8, in which the initial portion additionally compensates for differences in the actuator stopping distance between the first and second lens assemblies.

10. The camera of claim 9, in which the second signal means includes a photometric element for receiving light passing through the lens assembly and the initial portion additionally compensates for the illumination intensity error due to the position of the photometric element.

11. The camera of claim 10, in which the initial portion additionally compensates for the illumination intensity error in the film plane.

* * * * *